(12) United States Patent
Jeon

(10) Patent No.: US 8,733,391 B2
(45) Date of Patent: May 27, 2014

(54) VALVE FOR CONTROLLING PRESSURE

(75) Inventor: Man-Seuk Jeon, Changwon-si (KR)

(73) Assignee: Volvo Construction Equipment AB (SE)

(*) Notice: Subject to any disclaimer, the term of this patent is extended or adjusted under 35 U.S.C. 154(b) by 0 days.

(21) Appl. No.: 13/808,198

(22) PCT Filed: Jul. 6, 2010

(86) PCT No.: PCT/KR2010/004377
§ 371 (c)(1),
(2), (4) Date: Jan. 3, 2013

(87) PCT Pub. No.: WO2012/005390
PCT Pub. Date: Jan. 12, 2012

(65) Prior Publication Data
US 2013/0112291 A1  May 9, 2013

(51) Int. Cl.
*F16K 31/122* (2006.01)
(52) U.S. Cl.
USPC .............................. 137/491; 137/488; 251/50
(58) Field of Classification Search
CPC .................................................. F16K 17/105
USPC ................ 137/488, 491, 489.5, 495, 516.27, 137/625.39, 512, 538; 251/38, 39, 55, 282, 251/50
See application file for complete search history.

(56) References Cited

U.S. PATENT DOCUMENTS

| | | | | |
|---|---|---|---|---|
| 4,289,160 A * | 9/1981 | Kawasaki et al. | ............. | 137/491 |
| 4,476,890 A * | 10/1984 | Kawasaki et al. | ............. | 137/269 |
| 6,039,070 A * | 3/2000 | Zaehe | ............. | 137/491 |
| 6,986,362 B2 | 1/2006 | Cheong | | |
| 8,375,981 B2 * | 2/2013 | Jeon | ............. | 137/491 |
| 2003/0094201 A1 * | 5/2003 | Slawinski et al. | ............. | 137/488 |
| 2003/0111114 A1 * | 6/2003 | Koo | ............. | 137/491 |
| 2005/0178443 A1 | 8/2005 | Cheong | | |
| 2005/0183775 A1 * | 8/2005 | Cheong | ............. | 137/491 |
| 2007/0056632 A1 * | 3/2007 | Cheong | ............. | 137/491 |
| 2007/0356632 | 3/2007 | Cheong | | |
| 2009/0211650 A1 * | 8/2009 | Jeon | ............. | 137/488 |

OTHER PUBLICATIONS

International Search Report (in English and Korean) and Written Opinion of the International Searching Authority (in Korean) for PCT/KR2010/004377, mailed Mar. 24, 2011; ISA/KR.
International Preliminary Report on Patentability (PCT/IPEA/409) (in Korean) for PCT/KR2010/004377, mailed Oct. 17, 2012; IPEA/KR.

* cited by examiner

*Primary Examiner* — John Rivell
*Assistant Examiner* — Minh Le
(74) *Attorney, Agent, or Firm* — Harness, Dickey & Pierce, P.L.C.

(57) ABSTRACT

A pressure control valve is provided, which includes a stopper having a flow path for preventing damping that is provided in a contact portion that is adjacent to an inner flow path of a main piston so that hydraulic fluid in the main piston is smoothly drained through a gap between stopper contact surfaces.

1 Claim, 3 Drawing Sheets

VALVE FOR CONTROLLING PRESSURE

TECHNICAL FIELD

The present invention relates to a pressure control valve. More particularly, the present invention relates to a pressure control valve, which includes a stopper having a flow path for preventing damping provided in a contact portion that is adjacent to an inner flow path of a main piston so that hydraulic fluid in the main piston can be smoothly drained through a gap between stopper contact surfaces.

BACKGROUND ART

In general, a pressure control valve (which means a relief valve) is used to form a set pressure in a hydraulic circuit. In the case of replacing a working device depending on a work condition, the set pressure of the relief valve is reset depending on the working device.

Referring to FIG. 1, a pressure control valve in the related art includes a sleeve having a high-pressure flow path formed on one side thereof to pass high-pressure hydraulic fluid from a hydraulic pump and a hydraulic tank side flow path formed on a circumference thereof to drain the hydraulic fluid in the high-pressure flow path to the hydraulic tank; a poppet 20 controlling a flow rate of the hydraulic fluid flowing from the hydraulic pump side to the hydraulic tank side as sliding in the sleeve 10; a poppet spring 30 elastically supporting the poppet 20; a pilot poppet 40 draining the high pressure to the hydraulic tank if the high pressure that exceeds a set value is generated in a pressure chamber formed in the sleeve 10; a valve seat 50 installed to face the poppet 20 so as to form the set pressure in the pressure chamber in the sleeve 10; a pilot piston 60 sliding in the poppet 20 by an initial hydraulic pump pressure to be in contact with the pilot poppet 40; a pilot piston spring 70 elastically supporting the pilot piston 60; a pilot poppet spring 80 elastically supporting the pilot poppet 40, a main piston 100 slidably coupled to the inside of the guide 90 to variably adjust the set pressure in the pressure chamber in accordance with pilot signal pressure; a main piston spring 110 elastically installed in the guide 90 to elastically support the main piston 100; a stopper 120 controlling movement of the main piston 100; a control plug 130 controlling the set pressure of the main piston 100; a fastening member 141 fastened to the guide 90 to prevent a pressure change after setting the set pressure of a pressure control valve; and a fastening member 142 fastened to the control plug 130.

If the hydraulic fluid on the pilot line is pressed through a connection port 150, the hydraulic fluid is introduced at the main piston 100 through a line 2 formed on the guide 90. Through this, the main piston 100 moves in the right direction in the drawing to press the main piston spring 110 that fixedly supports the main piston 100. At the same time, the pilot poppet spring 80 moves in a direction where the elastic force of the pilot poppet spring 80 is lowered, and thus the pressure set value that is applied to the hydraulic pump is decreased to change the pressure set condition. At this time, the stick phenomenon occurs. That is, even if a desired pressure set value is input, the actual pressure does not coincide with the set pressure. This is because the main piston 100 and the stopper 120 are in close contact with each other to achieve a sealing effect between close contact surfaces thereof, and the hydraulic fluid in the main piston 100 is unable to be smoothly drained, but has a force to push the main piston 100 in the left direction in the drawing. Due to the increased force in the left direction in the drawing, pilot pressure to move the main piston 100 in the right direction in the drawing is increased to be the major cause of the initial pressure abnormality.

When the main piston 100 moves for the distance "X" in this state, the hydraulic fluid is not smoothly drained through the gap between the main piston 100 and the stopper 120, and a damping phenomenon occurs at a stroke end portion to lower the control pressure.

DISCLOSURE

Technical Problem

Therefore, the present invention has been made to solve the above-mentioned problems occurring in the related art, and one embodiment of the present invention is related to a pressure control valve, in which hydraulic fluid in a piston is smoothly drained, and thus control pressure is prevented from being instantaneously dropped to make a set pressure and an actual pressure equal to each other.

Technical Solution

In accordance with an aspect of the present invention, there is provided a pressure control valve, which includes a sleeve 10 having an inlet port formed thereon to receive hydraulic fluid from a hydraulic pump and a hydraulic tank flow path formed thereon to communicate with a hydraulic tank; a poppet 20 slidably coupled in the sleeve 10 to open/close a flow path between the inlet port and the hydraulic tank flow path; a poppet spring 30 elastically supporting the flow path between the inlet port and the hydraulic tank flow path in a closed state by pressing the poppet 20; a valve seat 50 installed to face the poppet 20 so as to form a set pressure in a pressure chamber in the sleeve 10; a pilot poppet 40 draining the hydraulic fluid in the pressure chamber to the hydraulic tank by opening a flow path of the valve seat 50 when high pressure that exceeds the set pressure is produced in the pressure chamber; a pilot poppet spring 80 elastically supporting the flow path of the valve seat 50 in a closed state by pressing the pilot poppet 40; a main piston 100 coupled to the sleeve 10 to make a guide 90 coupled to a plug 1 that is coupled to the sleeve 10 and to variably adjust the set pressure in the pressure chamber in accordance with pilot signal pressure that is supplied from an outside; a stopper 120 having a flow path 121 for preventing damping in a contact portion that faces an inner flow path 101 of the main piston 100 and eliminating a stick phenomenon so that the hydraulic fluid in the main piston 100 is smoothly drained; an adjustment plug 130 coupled to the guide 90 to adjust a set pressure of a main piston spring 110 that supports the main piston 100; and a connection port 150 rotatably coupled to an outer side surface of the plug 1 to form a path that communicates with the pilot port.

It is preferable that the flow path for preventing the damping and eliminating the stick phenomenon has a cross-section that is in the form of a "V"-shaped groove, and concave grooves are formed at every angle of 90° or 180° in a circumferential direction and in a length direction of the "V"-shaped groove of the cross-section.

Advantageous Effect

Since the hydraulic fluid in the piston can flow smoothly through the gap between the stopper contact surfaces, the pressure setting time of the relief valve can be reduced and the accurate pressure control becomes possible to achieve production of good-quality products.

BRIEF DESCRIPTION OF THE DRAWINGS

The above objects, other features and advantages of the present invention will become more apparent by describing the preferred embodiments thereof with reference to the accompanying drawings, in which.

BEST MODE

Hereinafter, a preferred embodiment of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 1:
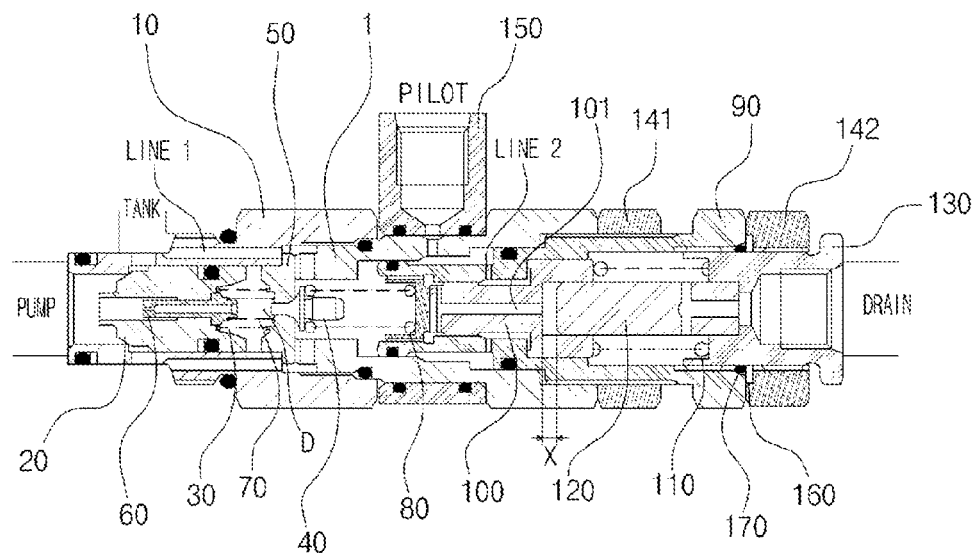
FIG. 1 is a cross-sectional view of a pressure control valve in the related art.
Figure 2:
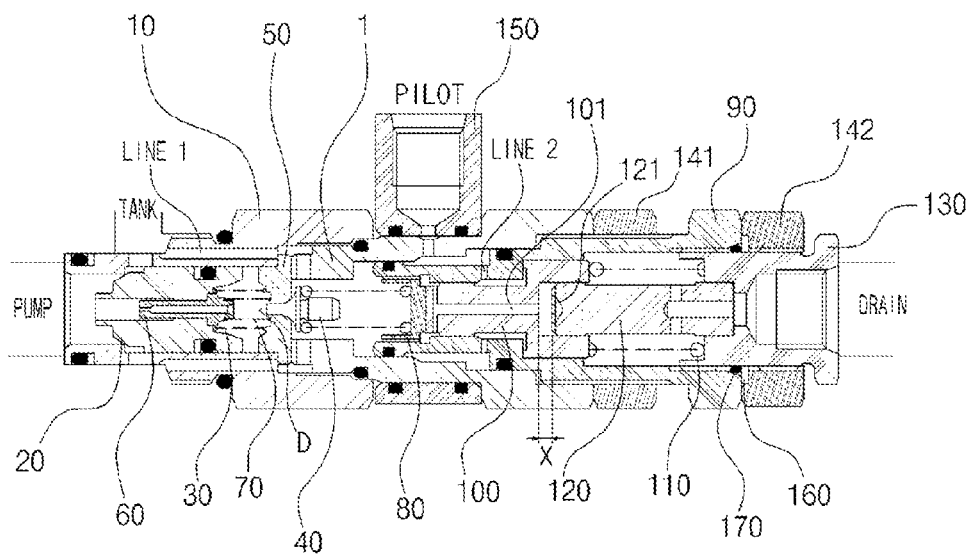
FIG. 2 is a cross-sectional view of a pressure control valve according to an embodiment of the present invention.
Figure 3:
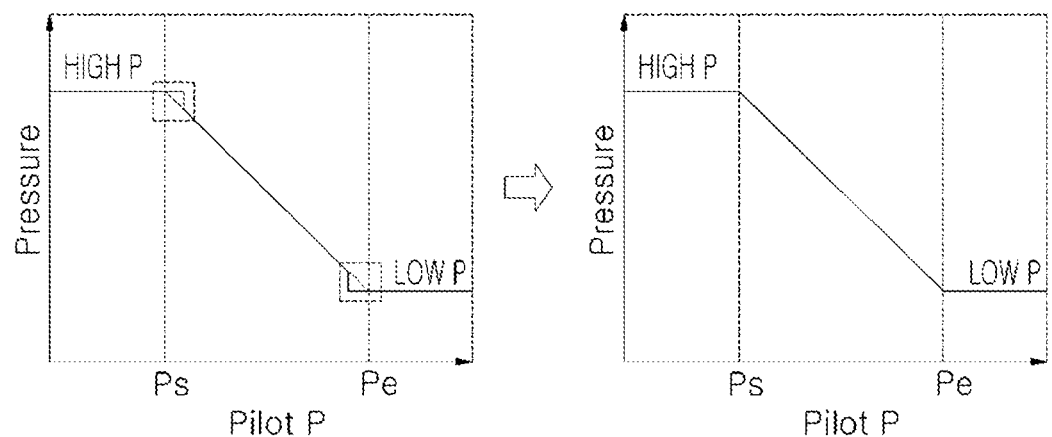
FIG. 3 is a graph illustrating pilot pressure versus pressure.
Figure 4:
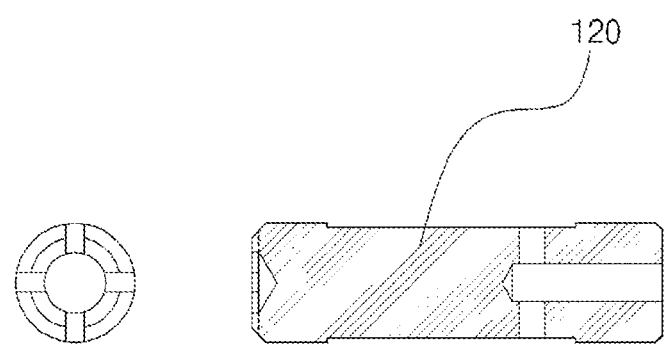
FIG. 4 is an enlarged cross-sectional view of a main part according to an embodiment of the present invention.

FIG. 2 is a cross-sectional view illustrating the configuration of a pressure control valve according to an embodiment of the present invention. FIG. 3 is a graph illustrating pilot pressure versus pressure. FIG. 4 shows a stopper 120 as seen in the drawing. The stopper 120 serves to control the stroke of a main piston 100 and to make hydraulic fluid in a main piston 100 flow to a drain side through a gap between the main piston 100 and the stopper 120. In this case, as shown in FIG. 2, the main piston 100 and the stopper 120 are not spaced apart from each other for a distance "X", but are in close surface contact with each other to achieve a sealing effect. At this time, hydraulic fluid in the main piston 100 is unable to flow to the drain side, but has a force to push the main piston 100 in the left direction. Due to the increased force in the left direction, pilot pressure to move the main piston 100 in the right direction is increased to be the major cause of initial pressure abnormality. If the hydraulic fluid is not smoothly drained through the gap between the main piston 100 and the stopper 120 while the main piston 100 moves for the distance "X" in this state, a damping phenomenon occurs at a stroke end portion. FIG. 3 is a graph showing an abnormal pressure state (a) where the damping phenomenon occurs and control pressure is instantaneously dropped and a normal pressure state (b) where there is no stick phenomenon.

FIG. 4 illustrates a left end portion of the stopper 120, as seen in the drawing, in order to prevent such a damping phenomenon. Referring to FIG. 4, a processed cross-sectional surface of a contact portion of the stopper 120 that faces an inner flow path 101 of the main piston 100 is in the form of a "V"-shaped groove to form a flow path 121. In order to drain the hydraulic fluid in the main piston 100 more smoothly, the flow path 121 may have a cross-section that is in the form of a "V"-shaped groove, and concave grooves may be formed at every angle of 90° or 180° in the circumferential direction and in the length direction of the "V"-shaped groove of the cross-section.

Figure 5:
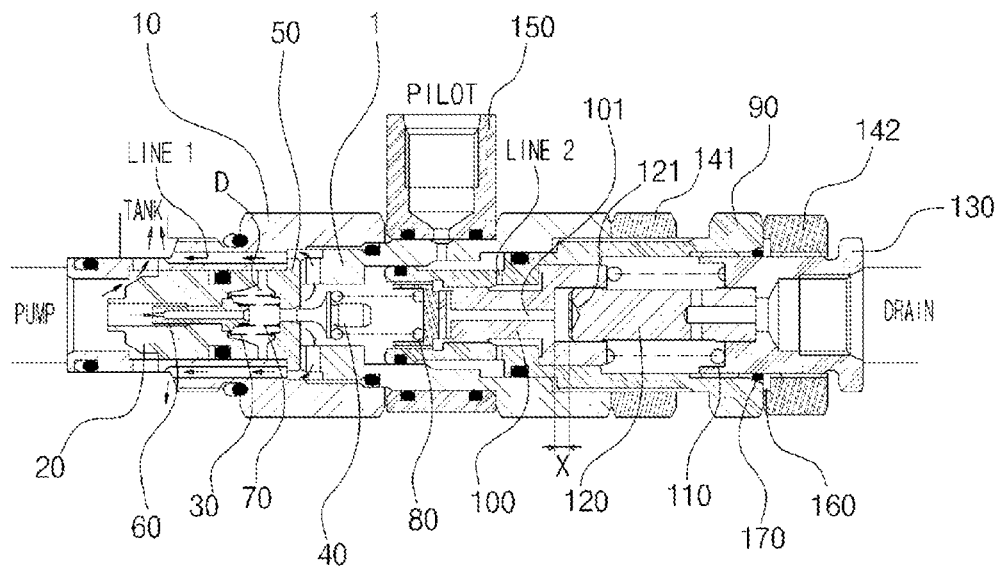
FIG. 5 is a cross-sectional view explaining a case where a pilot pressure path is closed during an overload operation.

FIG. 5 is a cross-sectional view explaining a case where a pilot pressure path is closed during an overload operation. Referring to FIG. 5, in the case where the pressure of the hydraulic fluid has a normal pressure set value, the hydraulic fluid that is discharged from the hydraulic pump flows into a pressure chamber D through an orifice provided in a poppet 20. In this case, due to a difference in cross-sectional surface between pressure-receiving portions, the poppet 20 is in close contact with a facing surface of an inner valve seat 50 of a sleeve 10. If the pressure of the hydraulic fluid reaches a pressure set value that is determined by a pilot poppet spring 80, a pilot poppet 40 is opened, and the hydraulic fluid flows from the pressure chamber D to a hydraulic tank through the valve seat 50 and a line 1. At the same time, the hydraulic fluid on an inlet side of the sleeve 10, of which the pressure is instantaneously dropped when the pilot poppet 40 is opened, moves to the right side as seen in the drawing to flow to the hydraulic tank. The set pressure at that time changes an elastic force of the pilot poppet spring 80 through the adjustment of the guide 90 to exert an influence on the set pressure.

Figure 6:
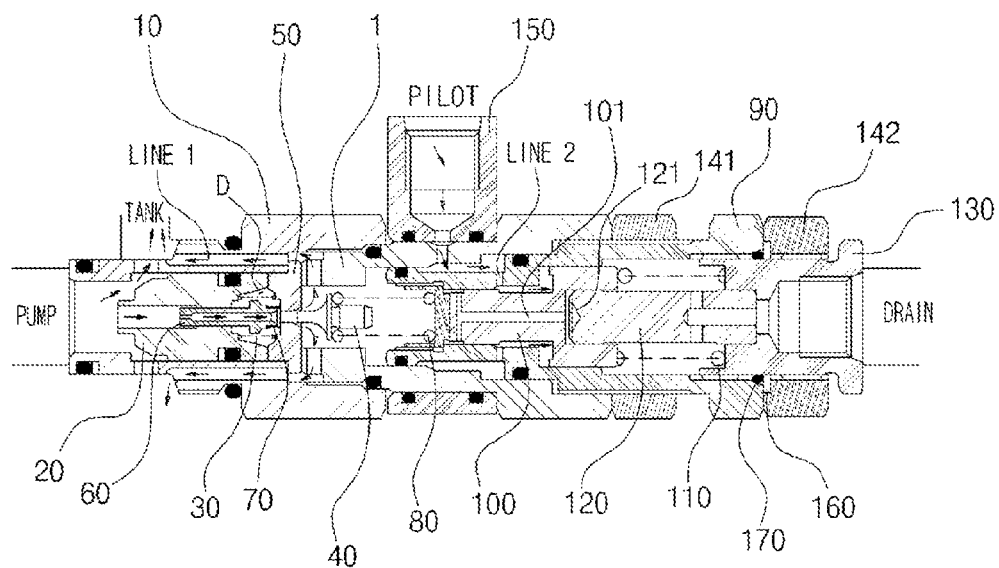
FIG. 6 is a cross-sectional view explaining a case where the pilot pressure path is opened when a pressure set value is changed.

FIG. 6 is a cross-sectional view explaining a case where the pilot pressure path is opened when the pressure set value is changed. Referring to FIG. 6, if the hydraulic fluid on the pilot line is pressed and the hydraulic fluid arrives at the main piston 100 through a line 2 formed on the guide 90, the main piston 100 moves to the right side in the drawing. In this case, a main piston spring 110 is compressed and the pilot poppet spring 80 moves in a direction where the elastic force of the pilot poppet spring 80 is lowered, so that the pressure set value that is applied to the hydraulic pump is decreased to change the pressure set condition. A connection port 150 is configured to be rotatable at 360 degrees and to be connectable to a pipe port, and a drain port is separately installed in the connection port 150. The hydraulic fluid that is discharged from the hydraulic pump passes through the orifice in the poppet 20, and stays in the pressure chamber D through a pilot piston 60. At this time, the hydraulic fluid does not flow to the hydraulic tank side by the action of a backup ring 160 and an O-ring 170. If the pilot pressure is adjusted and the main piston 100 move to the right side in the drawing after the initial pressure setting, the set pressure of the pilot poppet spring 80 is decreased.

The invention claimed is:
1. A pressure control valve comprising:
a sleeve having an inlet port formed thereon to receive hydraulic fluid from a hydraulic pump and a hydraulic tank flow path formed thereon to communicate with a hydraulic tank;
a poppet slidably coupled in the sleeve to open/close a flow path between the inlet port and the hydraulic tank flow path;
a poppet spring elastically supporting the flow path between the inlet port and the hydraulic tank flow path in a closed state by pressing the poppet;
a valve seat installed to face the poppet so as to form a set pressure in a pressure chamber in the sleeve;
a pilot poppet draining the hydraulic fluid in the pressure chamber to the hydraulic tank by opening a flow path of the valve seat when high pressure that exceeds the set pressure is produced in the pressure chamber;
a pilot poppet spring elastically supporting the flow path of the valve seat in a closed state by pressing the pilot poppet;

a main piston coupled to the sleeve to make a guide coupled to a plug that is coupled to the sleeve and to variably adjust the set pressure in the pressure chamber in accordance with pilot signal pressure that is supplied from an outside;

a stopper having a flow path for preventing damping in a contact portion that faces an inner flow path of the main piston and eliminating a stick phenomenon so that the hydraulic fluid in the main piston is smoothly drained;

an adjustment plug coupled to the guide to adjust a set pressure of a main piston spring that supports the main piston;

a connection port rotatably coupled to an outer side surface of the plug to form a path that communicates with the pilot port; and wherein the flow path for preventing the damping and eliminating the stick phenomenon has a cross-section that is in the form of a "V"-shaped groove, and concave grooves are formed at every angle of 90° or 180° in a circumferential direction and in a length direction of the "V"-shaped groove of the cross-section.

* * * * *